United States Patent
Matsuoka et al.

(10) Patent No.: US 11,606,479 B2
(45) Date of Patent: *Mar. 14, 2023

(54) IMAGE PROCESSING SYSTEM AND IMAGE PROCESSING METHOD

(71) Applicant: SONY CORPORATION, Tokyo (JP)

(72) Inventors: Yuki Matsuoka, Kanagawa (JP); Norihiko Kawada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,680

(22) Filed: Sep. 11, 2019

(65) Prior Publication Data

US 2020/0007719 A1 Jan. 2, 2020

Related U.S. Application Data

(63) Continuation of application No. 15/101,635, filed as application No. PCT/JP2014/005776 on Nov. 18, 2014, now Pat. No. 10,440,234.

(30) Foreign Application Priority Data

Dec. 12, 2013 (JP) ................................. 2013-257372

(51) Int. Cl.
*H04N 1/60* (2006.01)
*G06K 9/00* (2022.01)

(52) U.S. Cl.
CPC ................................. *H04N 1/6058* (2013.01)

(58) Field of Classification Search
None
See application file for complete search history.

(56) References Cited

U.S. PATENT DOCUMENTS

2002/0044293 A1 4/2002 Fukasawa
2004/0150850 A1 8/2004 Hanamoto
(Continued)

FOREIGN PATENT DOCUMENTS

EP 1 197 917 A2 4/2002
EP 1 197 917 A3 4/2002
(Continued)

OTHER PUBLICATIONS

Wikipedia, Gamut https://en.wikipedia.org/wiki/Gamut, Apr. 6, 2004 (Year: 2004).*
Apple, Final Cut Pro , https://www.apple.com/final-cut-pro/specs/, Jun. 21, 2011 (Year: 2011).*
(Continued)

*Primary Examiner* — Randolph I Chu
(74) *Attorney, Agent, or Firm* — Oblon, McClelland, Maier & Neustadt, L.L.P.

(57) ABSTRACT

An imaging processing system includes an image pickup device that has circuitry which creates, from raw image data, image data including a first gamut, and compression-codes the image data including the first gamut to generate compression-coded image data. The system also includes an image processing device that has circuitry which decodes the compression-coded image data to generate uncompressed image data, which includes the first gamut. The circuitry of the image processing device also converts the uncompressed image data including the first gamut into image data including a second gamut, where the first gamut encompasses the second gamut.

17 Claims, 5 Drawing Sheets

(56) References Cited

U.S. PATENT DOCUMENTS

| | | | |
|---|---|---|---|
| 2004/0190770 A1* | 9/2004 | Spaulding | H04N 1/6058 |
| | | | 382/167 |
| 2007/0242079 A1* | 10/2007 | Hayaishi | G06T 11/001 |
| | | | 345/604 |
| 2007/0279703 A1 | 12/2007 | Fukuda | |
| 2008/0117446 A1 | 5/2008 | Fukasawa | |
| 2008/0204581 A1 | 8/2008 | Tsugita et al. | |
| 2011/0181760 A1 | 7/2011 | Horie | |
| 2015/0264333 A1 | 9/2015 | Ishiga | |
| 2016/0037019 A1* | 2/2016 | Xue | H04N 1/46 |
| | | | 345/590 |

FOREIGN PATENT DOCUMENTS

| | | |
|---|---|---|
| EP | 1 370 070 A1 | 12/2003 |
| JP | 2004-282599 A | 10/2004 |
| JP | 2006-107451 A | 4/2006 |
| JP | 2008-17441 A | 1/2008 |
| JP | 2008-245248 A | 10/2008 |
| JP | 2009-33385 A | 2/2009 |
| JP | 2009-147463 A | 7/2009 |
| JP | 2010-11191 A | 1/2010 |
| JP | 2013-102533 A | 5/2013 |

OTHER PUBLICATIONS

Photographymad ("What is EXIF" Data(Jul. 12, 2011)) (Year: 2011).*
Duguid ("Changing Colour Space in Photoshop & Lightroom", https://www.youtube.com/watch?v=Bxzlkko1Ld0, Jan. 2013) (Year: 2013).*
Adobe ("Adobe RGB Color Space Specification", Oct. 2004) (Year: 2004).*
Friedl ("Digital-Image Color Spaces", p. 7, http://regex.info/blog/photo-tech/color-spaces-page7). (Year: 2006).*
International Search Report dated Mar. 3, 2015, in PCT/JP2014/005776 filed Nov. 18, 2014.
Office Action dated Jan. 10, 2017 in Japanese Patent Application No. 2013-257372.
European Office Action dated Oct. 2, 2017 in Patent Application No. 14 809 535.9.
Office Action dated Aug. 9, 2018 in European Patent Application No. 14 809 535.9.
Office Action dated Mar. 29, 2019 in European Patent Application No. 14809535.9.
Sony Corporation, "XAVC Specification Overview", Revision 2, XP055568003, Sep. 13, 2013.
Adobe® RGB (1998) Color Image Encoding, 2005.
Nikon D5100 Reference Manual. 2011.
Sutton, AdobeRGB vs. sRGB, Fstoppers, Feb. 17, 2013.

* cited by examiner

IMAGE PROCESSING SYSTEM AND IMAGE PROCESSING METHOD

CROSS-REFERENCE TO RELATED APPLICATIONS

This application is a continuation of U.S. patent application Ser. No. 15/101,635, filed Jun. 3, 2016, which is based on PCT Application No. PCT/JP2014/005776, filed Nov. 18, 2014, and claims the benefit of priority from Japanese Patent Application No. 2013-257372, filed Dec. 12, 2013, the entire contents of each which are incorporated herein by reference.

TECHNICAL FIELD

The present technology relates to an image processing system including an image pickup device having a development function and an image processing device configured to convert image data obtained by the image pickup device into image data having a gamut for purpose. The present technology further relates to an image processing method.

BACKGROUND ART

An image pickup device develops RAW data obtained by an image sensor into image data having a desired gamut, and outputs the data. The ideal gamut for image data is different depending on purposes of image data such as for example a television set, a projector, a video film, and printing. Because of this, if image data output from an image pickup device having a development function as described above is used for a purpose different from the purpose planned for the image pickup device, it is necessary to convert the gamut of the image data supplied from the image pickup device into a gamut for the different purpose.

However, in this case, it is not possible to reproduce the gamut part, which is already lacked from RAW data, of the image data output from the image pickup device. Because of this, if the image data output from the image pickup device is converted into image data having gamut wider than the gamut of the image data output from the image pickup device, color reproducibility of is decreased.

In view of this, there is known a method of transmitting RAW data obtained by an image sensor of an image pickup device to an image processing device via a medium or via communication, and developing the RAW data into image data having a desired gamut by an image processing device (e.g., see PTL 1). According to this method, the gamut and the gamma for image data may be selected at will when developing the image data. However, because RAW data is transmitted as it is via a medium or via communication, the volume of transmitted data is large, and speed enhancement is hindered.

CITATION LIST

Patent Literature

PTL 1: Japanese Patent Application Laid-open No. 2009-033385 (paragraphs 0044 and 0055)

SUMMARY

Technical Problem

An image processing system, which includes an image pickup device capable of developing image data and an image processing device capable of converting the gamut of the image data output from the image pickup device into gamut for purpose, still has various unsolved problems concerning performances such as color reproducibility and speed. It is desirable to take measures against such problems.

In view of the above-mentioned circumstances, it is desirable to to provide an image processing system and an image processing method having excellent performances such as excellent color reproducibility and fast transmission.

Solution to Problem

In an exemplary aspect, an imaging processing system includes an image pickup device that has circuitry which creates, from raw image data, image data including a first gamut, and compression-codes the image data including the first gamut to generate compression-coded image data. The system also includes an image processing device that has circuitry which decodes the compression-coded image data to generate uncompressed image data, which includes the first gamut. The circuitry of the image processing device also converts the uncompressed image data including the first gamut into image data including a second gamut, where the first gamut encompasses the second gamut.

In another exemplary aspect, an image pickup apparatus has circuitry that creates image data including a first gamut from raw image data, and that compression-codes the image data including the first gamut to generate compression-coded image data. The circuitry also transmits the compression-coded image data to another device, and the first gamut encompasses a second gamut of the another device.

In a further exemplary aspect, an image processing method includes creating, with circuitry of a first device, image data including a first gamut from raw image data, and compression-coding, with the circuitry of the first device, the image data including the first gamut to generate compression-coded image data. The method also includes decoding, with circuitry of a second device, the compression-coded image data to generate uncompressed image data including the first gamut, and converting, with the circuitry of the second device, the uncompressed image data including the first gamut into image data including a second gamut. The first gamut encompasses the second gamut.

In a still further exemplary aspect, a non-transitory computer-readable medium is encoded with computer-readable instructions that when executed by a computer, cause the computer to perform a method, which includes creating image data including a first gamut from raw image data. The method also includes compression-coding the image data including the first gamut to generate compression-coded image data and decoding the compression-coded image data to generate uncompressed image data including the first gamut. The method further includes converting the uncompressed image data including the first gamut into image data including a second gamut, where the first gamut encompasses the second gamut.

Advantageous Effects of Invention

As described above, according to the present technology, there is realized an image processing system having excellent performances such as excellent color reproducibility and fast transmission.

DESCRIPTION OF EMBODIMENTS

Hereinafter, an embodiment of the present technology will be described with reference to the drawings.

First Embodiment

Figure 1:
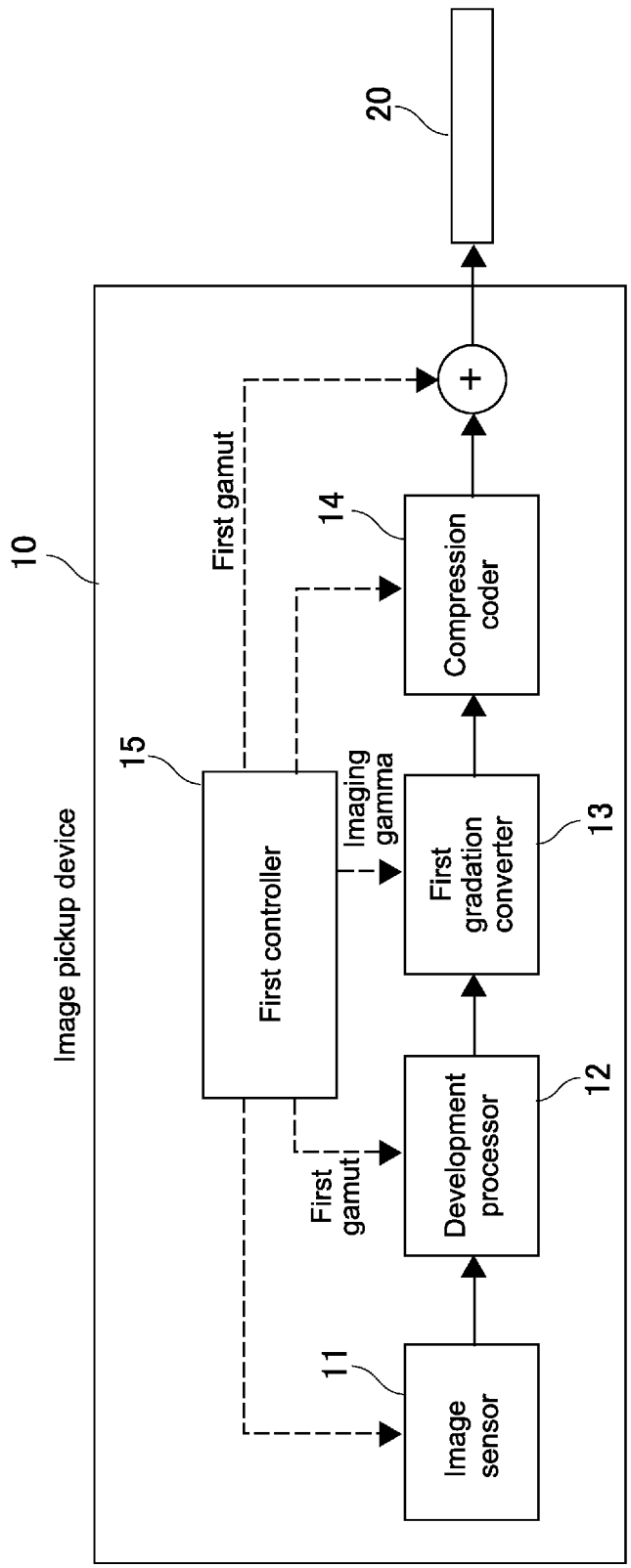
FIG. 1 is a block diagram showing the configuration of an image pickup device 10 of an image processing system 1 of this embodiment.
Figure 2:
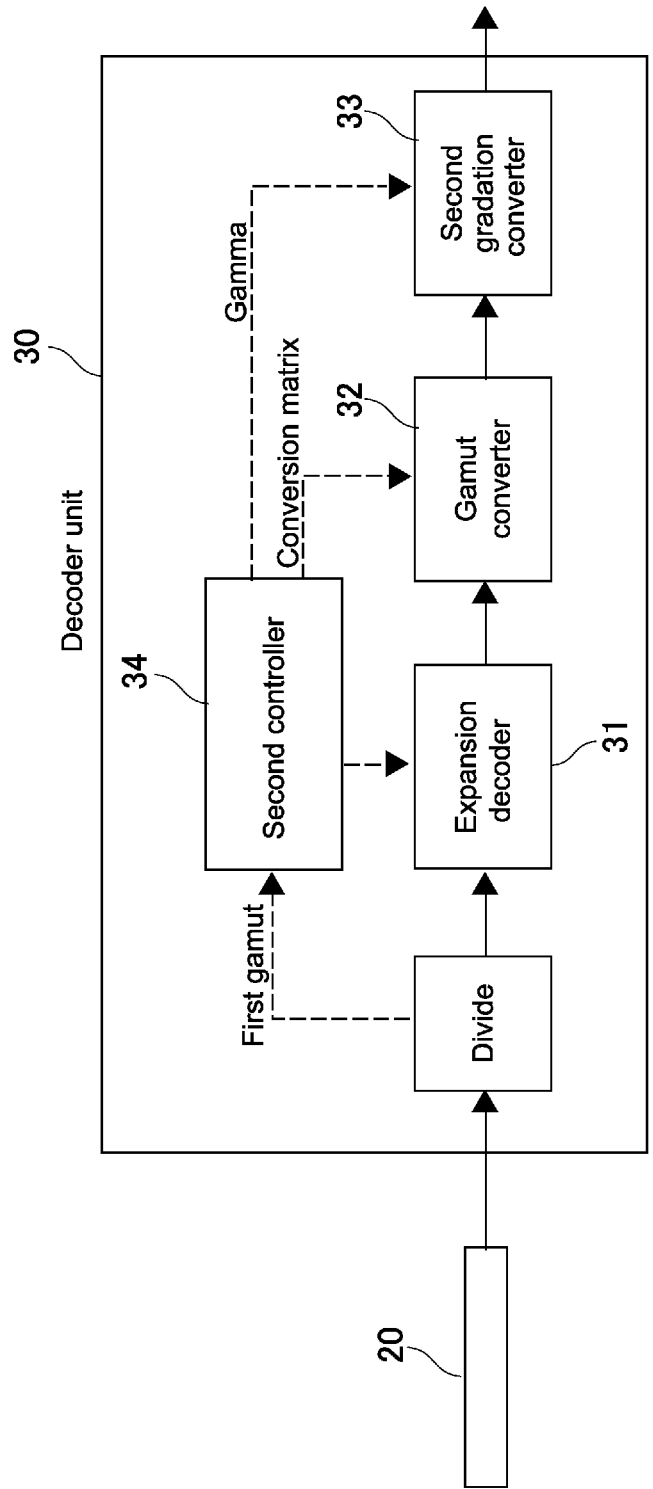
FIG. 2 is a block diagram showing the configuration of a decoder unit 30 of the image processing system 1 of this embodiment.

FIG. 1 and FIG. 2 are block diagrams each showing the configuration of an image processing system according to a first embodiment of the present technology.

The image processing system 1 includes an image pickup device 10, a transmission path 20, and a decoder unit (image processing device) 30.

(Image Pickup Device 10)

FIG. 1 is a block diagram showing the configuration of the image pickup device 10 of the image processing system 1 of this embodiment.

The image pickup device 10 includes an image sensor 11, a development processor 12, a first gradation converter 13, a compression coder 14, and a first controller 15.

The image sensor 11 is an image sensor such as for example a CMOS (Complementary MOS) image sensor or a CCD (Charge Coupled Device) image sensor. The image sensor 11 converts light into RGB electric signals depending on its intensity, converts the analog signals into a digital signal series, and outputs the signal series as RAW data.

The development processor 12 converts the RAW data output from the image sensor 11 into image data having a first gamut. Specifically the development processor 12 is for example a circuit or the like configured to convert RAW data into image data having the first gamut by using a conversion matrix (first conversion matrix) or the like. The first gamut will be described later.

The first gradation converter 13 adjusts the image data having the first gamut obtained by the development processor 12 by using imaging gamma (e.g., S-Log gamma, etc.) under the assumption that the image tone is to be adjusted after taking an image. This kind of imaging gamma is designed as a non-linear function so as to involve shadow and highlight information as much as possible. The more the shadow and highlight information, the greater the flexibility of color correction in post-production.

The compression coder 14 compression-codes the image data having the first gamut output from the first gradation converter 13. For example, MPEG (Moving Picture Experts Group) is adopted as a compression-coding method. The compression-coded image data having the first gamut is transmitted to the decoder unit 30 via the transmission path 20.

The first controller 15 controls the operations of the image sensor 11, the development processor 12, the first gradation converter 13, the compression coder 14, and the like. For example, the first controller 15 is capable of selecting the first gamut or the first conversion matrix for the development processor 12, selecting the imaging gamma for the first gradation converter 13, and the like. Further, the first controller 15 transmits metadata to the decoder unit 30 via the transmission path 20. The metadata includes information on the first gamut selected for the development processor 12, information on the imaging gamma selected for the first gradation converter 13, and the like.

(Decoder Unit 30)

The decoder unit 30 is an image processing device configured to create image data having the desired gamut and the desired gamma from image data transmitted from the image pickup device 10.

FIG. 2 is a block diagram showing the configuration of the decoder unit 30 of the image processing system 1 of this embodiment.

The decoder unit 30 includes an expansion decoder 31, a gamut converter 32, a second gradation converter 33, and a second controller 34.

The expansion decoder 31 expansion-decodes the compression-coded image data having the first gamut transmitted from the image pickup device 10 via the transmission path 20.

The gamut converter 32 converts the image data expansion-decoded by the expansion decoder 31 into image data having a second gamut depending on a purpose of the image data. Specifically the gamut converter 32 is for example a circuit configured to convert the gamut of image data by using a conversion matrix (second conversion matrix) or the like. The second gamut will be described later.

The second gradation converter 33 gamma-adjusts the image data having the second gamut output from the gamut converter 32 as necessary to thereby adjust gradation.

The second controller 34 controls the expansion decoder 31, the second gradation converter 33, and the gamut converter 32.

The second controller 34 sets one kind of gamut selected from a plurality of kinds of gamut, which the decoder unit 30 is capable of setting, as the second gamut based on an instruction from for example a user or the like. Here, the plurality of kinds of gamut, which the decoder unit 30 is capable of setting, are specifically for example S-Gamut 3, ITU-709, ITU 2020, DCI P3, film gamut, and the like. The second gamut may be selected before the image processing system 1 processes an image, or may be arbitrarily selected by a user when the image processing system 1 processes an image.

The second controller 34 obtains information on the first gamut from metadata transmitted from the image pickup device 10 via the transmission path 20, and sets a conversion matrix corresponding to the combination of the first gamut and the second gamut for the gamut converter 32.

Further, the second controller 34 is capable of selecting the gamma, which is applied to image data by the second gradation converter 33, based on an instruction from a user for example.

(First Gamut and Second Gamut)

Here, the first gamut and the second gamut will be described.

There are various kinds of gamut for image data for different purposes.

For example, as gamut for liquid crystal television sets, there are known ITU-709, ITU2020, and the like. ITU-709 is a gamut mode in conformity to ITU-R BT.709 standard. ITU2020 corresponds to liquid crystal television sets supporting 4K.

As gamut for digital cinema, there are known S-Gamut3, DCI P3, and ACES.

S-Gamut3 is gamut for a wide gamut mode supported by a digital cinematography camera manufactured by Sony Corporation.

DCI P3 (Digital Cinema Initiatives) is one kind of gamut proposed by DCI (Digital Cinema Initiatives) as gamut for images projected by projectors in movie theaters.

The decoder unit 30 sets, as the second gamut, one kind of gamut selected by a user out of the plurality of above-mentioned kinds of gamut. Meanwhile, as the first gamut applied for the development processor 12 of the image pickup device 10, gamut containing the plurality of kinds of gamut, which the decoder unit 30 is capable of setting, is used.

Figure 3:
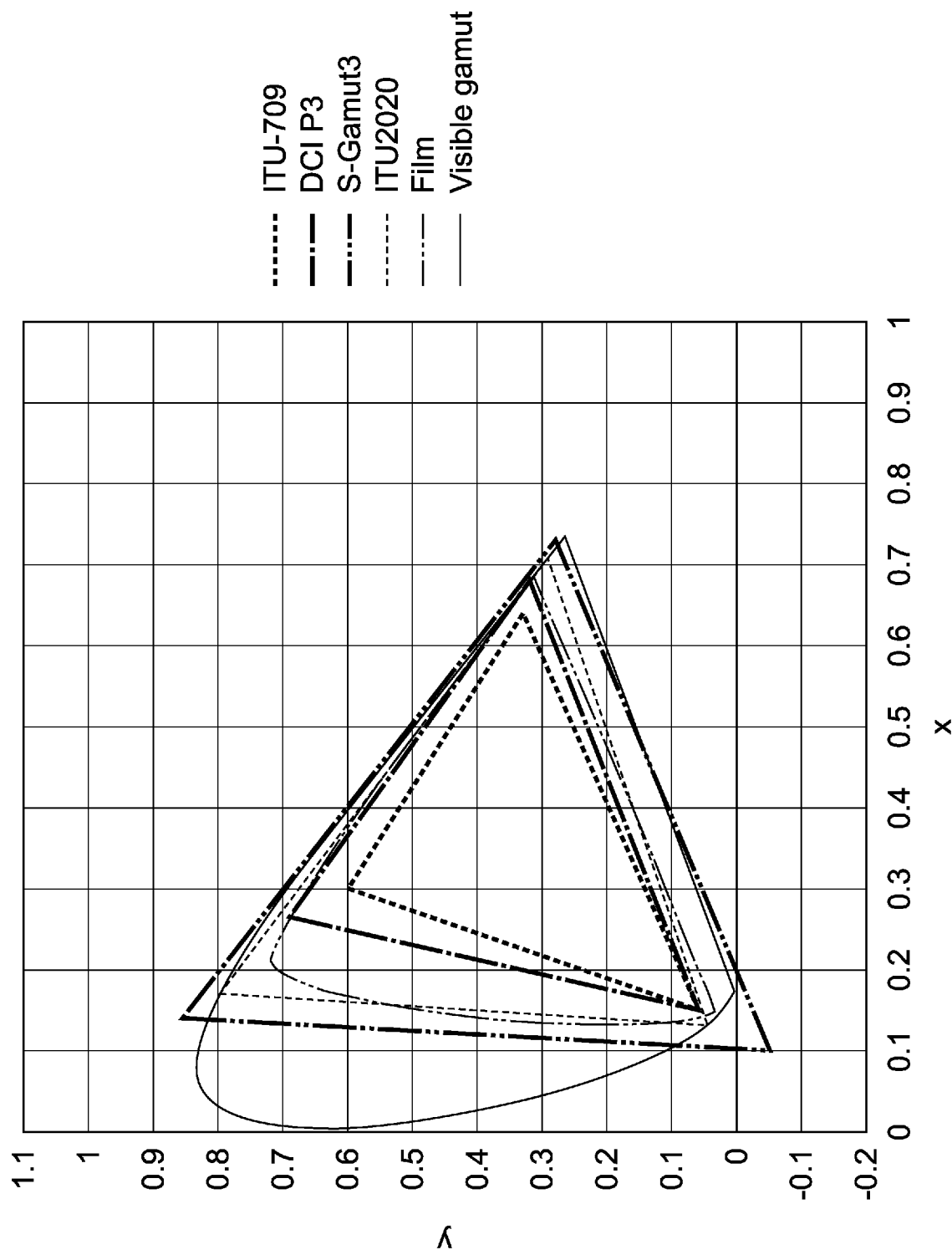
FIG. 3 is a diagram showing various kinds of gamut, which are compared with one another.

FIG. 3 is a diagram showing the respective kinds of gamut, i.e., ITU-709, ITU2020, DCI P3, S-Gamut3, film gamut, the visible gamut, which are compared with one another.

It is understood that S-Gamut3 includes all the above-mentioned kinds of gamut except the visible gamut, i.e., ITU-709, ITU2020, DCI P3, and film gamut. Under the relation of the plurality of kinds of gamut, S-Gamut3 may be used as the first gamut. That is, if one kind of gamut out of the plurality of kinds of gamut, which the decoder unit 30 is capable of setting, includes the other kinds of gamut, the one kind of gamut may be used as the first gamut for the image pickup device 10.

(Operations of Image Processing System 1)

Next, the operations of the image processing system 1 of this embodiment will be described.

Figure 4:
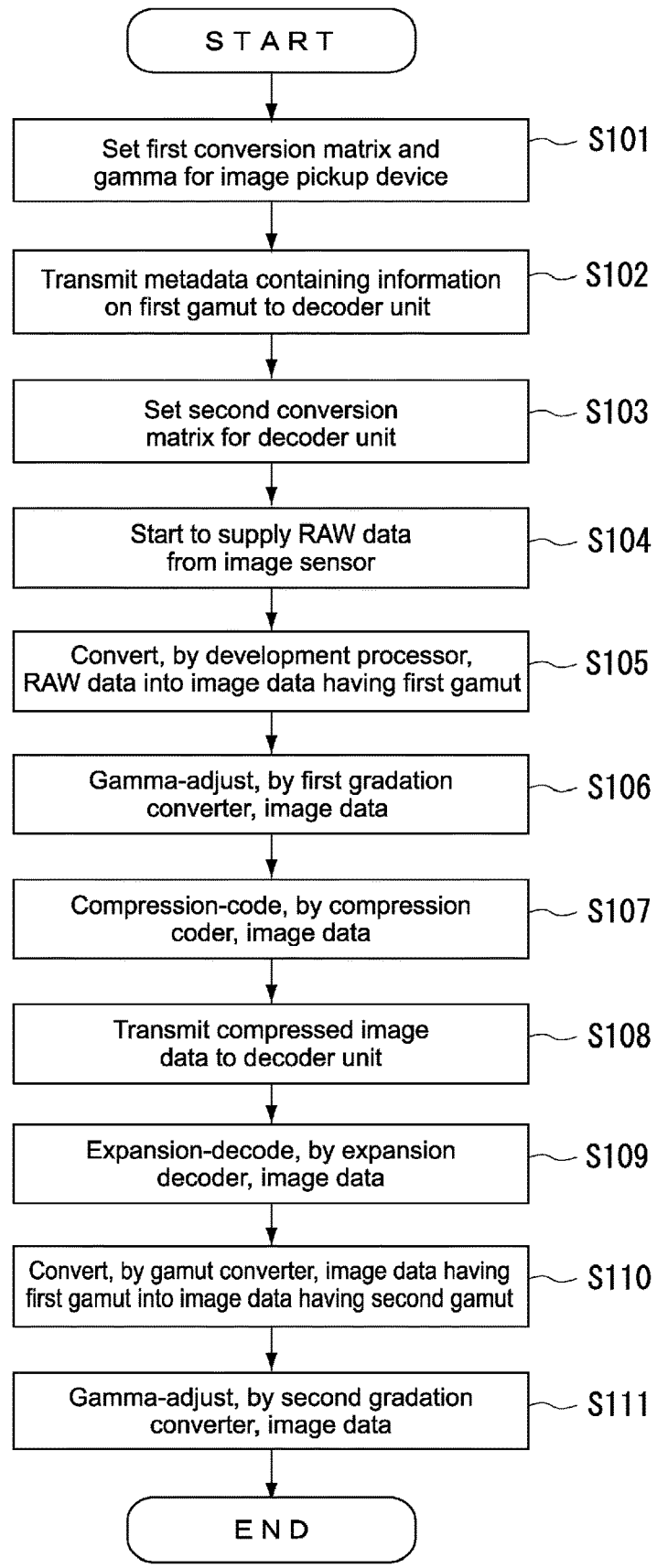
FIG. 4 is a flowchart showing the operations of the image processing system 1 of this embodiment.

FIG. 4 is a flowchart showing the operations of the image processing system 1.

First, as the operation of the image pickup device 10, the first controller 15 sets a first conversion matrix for the development processor 12. The first conversion matrix is used to convert RAW data into image data having a first gamut. Further, the first controller 15 sets an imaging gamma for the first gradation converter 13 (Step S101).

Next, the first controller 15 creates metadata at least containing information on the first gamut, and transmits the metadata to the decoder unit 30 via the transmission path 20 (Step S102).

The second controller 34 of the decoder unit 30 receives the metadata via the transmission path 20. Then, the second controller 34 sets the first gamut and a second conversion matrix for the gamut converter 32. The first gamut is specified by information on the first gamut contained in the metadata. The second conversion matrix corresponds to the combination of the first gamut and a second gamut selected by the decoder unit 30 (Step S103).

Here, a memory of the second controller 34 prestores information on second conversion matrixes corresponding to various gamut combinations, respectively. The second controller 34 refers to the memory and is capable of obtaining information on the second conversion matrix. The second conversion matrix corresponds to the combination of the first gamut and the second gamut. The first gamut is contained in the metadata, and the image pickup device 10 notifies the second controller 34 of the metadata.

The image sensor 11 supplies RAW data to the development processor 12 (Step S104). Then the development processor 12 converts the RAW data into image data having a first gamut by using the above-mentioned first conversion matrix (Step S105).

Note that the first controller 15 may obtain information on all the kinds of gamut from the decoder unit 30 via the transmission path 20 and may automatically specify a first gamut based on the information, whereby the image pickup device 10 sets a conversion matrix.

Next, the first gradation converter 13 gamma-adjusts the image data having the first gamut output from the development processor 12 by using the selected imaging gamma (Step S106).

Next, the compression coder 14 compression-codes the image data having the first gamut supplied from the first gradation converter 13 (Step S107). The compressed image data obtained by the compression coder 14 is transmitted to the decoder unit 30 via the transmission path 20 (Step S108).

Note that a lossy compression method such as MPEG is used as a compression coding method for images. However, the present technology is not limited thereto. A lossless compression method may be adopted.

A transmission system such as for example an SDI (Serial Digital Interface) is used for the transmission path 20 between the image pickup device 10 and the decoder unit 30. As a matter of course, the transmission system of the present technology is not limited to SDI.

The expansion decoder 31 expansion-decodes the image data transmitted to the decoder unit 30 (Step S109).

Next, the gamut converter 32 converts the image data having the first gamut expansion-decoded by the expansion decoder 31 into image data having a second gamut by using the second conversion matrix (Step S110). As a result, image data having a gamut for purpose is obtained.

Next, the second gradation converter 33 adjusts the image data having the second gamut output from the gamut converter 32 by using a gamma set depending on a purpose of the image data. Alternatively, the image data may not be gamma-adjusted, but may be output as it is (Step S111).

Here, if S-Gamut3 is set as the first gamut, one of a plurality of kinds of gamut, which are contained in the gamut of S-Gamut3, is selected as the second gamut. Examples of such kinds of gamut include ITU-709, ITU2020, DCI P3, and film gamut.

It is assumed that the decoder unit 30 may employ the gamut of S-Gamut3 as the second gamut. In this case, the gamut converter 32 does not convert the gamut.

As described above, according to the image processing system 1 of this embodiment, the image pickup device 10 develops RAW data as image data having a gamut containing all the kinds of gamut, which the decoder unit 30 is capable of setting. Because of this, irrespective of a plurality of kinds of gamut, which the decoder unit 30 is capable of setting, of converted image data, the color reproducibility of the image is not decreased.

If the gamut same as the first gamut is set as the second gamut (e.g., S-Gamut3, etc.), it is not necessary for the decoder unit 30 to convert the gamut, which may lead to speed enhancement.

Further, the volume of transmitted data is smaller than that of a method of transmitting RAW data to the decoder unit 30 as it is, which may lead to speed enhancement.

Modification Example 1

In the above-mentioned embodiment, under the relation of all the kinds of gamut, which the decoder unit 30 is capable of setting, if one kind of gamut includes the other kinds of gamut, the one kind of gamut may be used as the first gamut. The present technology is not limited to this.

Figure 5:
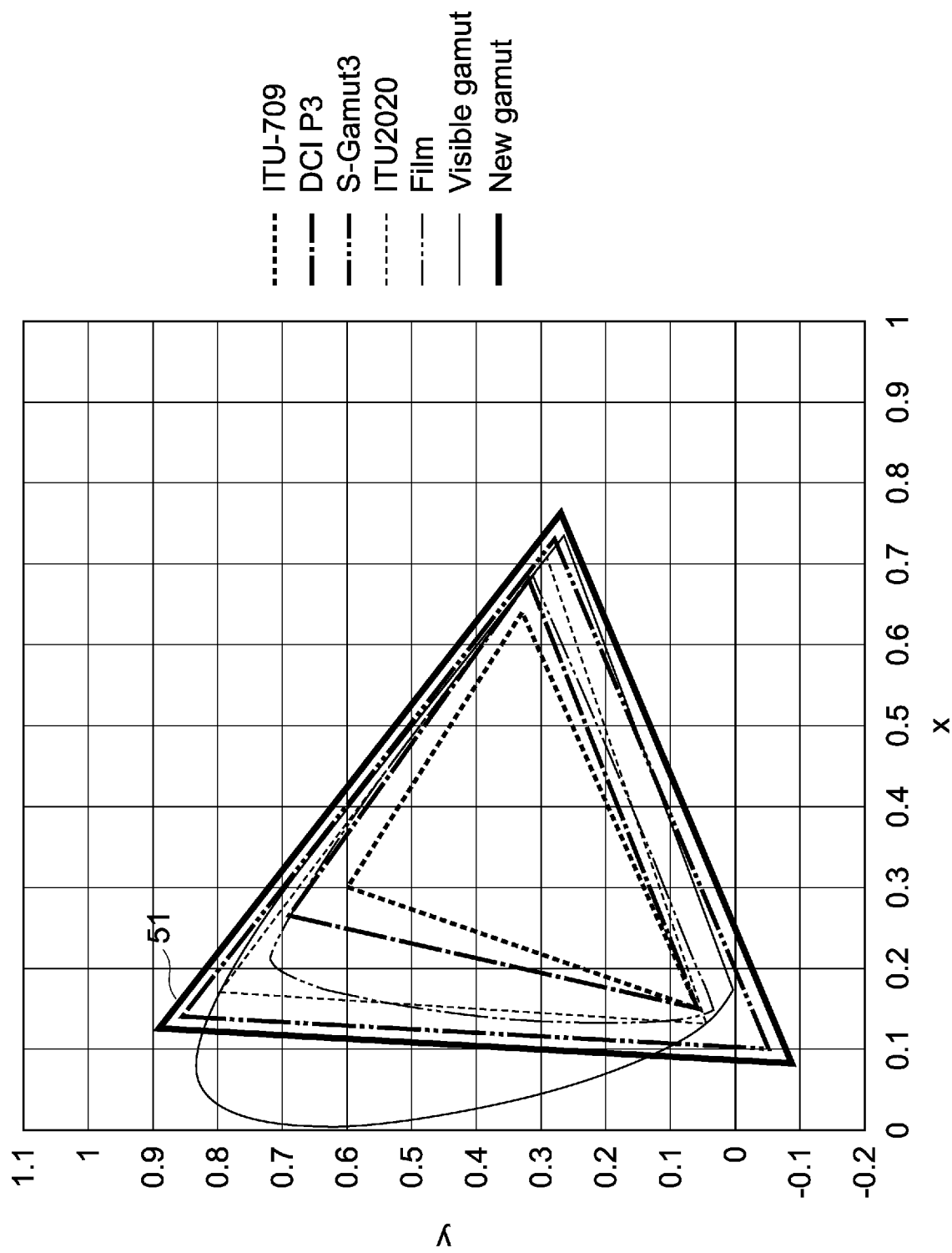
FIG. 5 is a diagram illustrating various kinds of gamut of a modification example.

For example, as shown in FIG. 5, a new gamut 51 may be set as the first gamut. The new gamut 51 contains all the kinds of gamut, which the decoder unit 30 is capable of setting, and is wider than S-Gamut3. As a result, also, the color reproducibility of an image is not decreased, and the volume of transmitted data is smaller, which may lead to speed enhancement.

The decoder unit 30 is capable of setting the following kinds of gamut, i.e., ITU-709, ITU2020, DCI P3, S-Gamut3, and film gamut. The present technology is not limited to them.

For example, let's assume that the decoder unit 30 is capable of setting three kinds of gamut, i.e., ITU-709, ITU2020, and DCI P3. In this case, ITU2020 contains the other kinds of gamut, i.e., ITU-709 and DCI P3. That is, ITU2020 may be the first gamut.

Note that the present technology may employ the following configurations.

(1) An imaging processing system comprising: an image pickup device including circuitry configured to create image data including a first gamut from raw image data, and compression-code the image data including the first gamut to generate compression-coded image data; and an image processing device including circuitry configured to decode the compression-coded image data to generate uncompressed image data including the first gamut, and convert the uncompressed image data including the first gamut into image data including a second gamut, wherein the first gamut encompasses the second gamut.

(2) The system according to (1), wherein the image pickup device transmits the compression-coded image data to the image processing device via a predetermined transmission path.

(3) The system according to (2), wherein the image pickup device further transmits metadata including information regarding the first gamut to the image processing device via the predetermined transmission path.

(4) The system according to (3), wherein the metadata further includes information regarding imaging gamma.

(5) The system according to any one of (1) to (4), wherein the circuitry of the image processing device is further configured to convert the uncompressed image data including the first gamut into the image data including the second gamut using a conversion matrix.

(6) The system according to (5), wherein the conversion matrix corresponds to a predetermined combination of the first gamut and the second gamut.

(7) The system according to (6), wherein the first gamut includes S-Gamut3.

(8) The system according to (7), wherein the second gamut includes DCI P3, ACES, ITU-709, ITU-R BT. 709, ITU 2020, or a film gamut.

(9) The system according any one of (7) to (8), wherein the circuitry of the image processing device is further configured to store a plurality of matrices, each corresponding to a different combination of the first gamut with the second gamut.

(10) The system according to (9), wherein the circuitry of the image processing device is further configured to select one of the plurality of matrices as the conversion matrix based on gamut metadata received from the image pickup device.

(11) The system according to any one of (1) to (10), wherein the circuitry of the image pickup device is further configured to adjust a gamma of the image data including the first gamut.

(12) The system according to any one of (1) to (11), wherein the circuitry of the image pickup device is further configured to use lossy compression when compression-coding the image data including the first gamut.

(13) The system according to (12), wherein the lossy compression includes MPEG compression coding.

(14) The system according to any one of (2) to (3), wherein the predetermined transmission path includes a serial digital interface (SDI).

(15) The system according to any one of (1) to (14), wherein the circuitry of the image processing device is further configured to adjust a gradation of the image data including the second gamut using predetermined gamma information.

(16) An image processing method, comprising: creating, with circuitry of a first device, image data including a first gamut from raw image data; compression-coding, with the circuitry of the first device, the image data including the first gamut to generate compression-coded image data; decoding, with circuitry of a second device, the compression-coded image data to generate uncompressed image data including the first gamut; and converting, with the circuitry of the second device, the uncompressed image data including the first gamut into image data including a second gamut, wherein the first gamut encompasses the second gamut.

(17) A non-transitory computer-readable medium encoded with computer-readable instructions thereon, the computer readable instructions, when executed by a computer, cause the computer to perform a method comprising: creating image data including a first gamut from raw image data; compression-coding the image data including the first gamut to generate compression-coded image data; decoding the compression-coded image data to generate uncompressed image data including the first gamut; and converting the uncompressed image data including the first gamut into image data including a second gamut, wherein the first gamut encompasses the second gamut.

(A01) An image processing system, comprising:
an image pickup device including
an image sensor,
a development processor configured to create image data having a first gamut from RAW data, the RAW data being captured by the image sensor, and
a compression coder configured to compression-code the created image data having the first gamut; and
an image processing device capable of connecting to the image pickup device via a transmission path, the image processing device including
an expansion decoder configured to expansion-decode the compression-coded image data to thereby decompress the image data having the first gamut, the compression-coded image data being transmitted via the transmission path, and
a gamut converter configured to convert the decompressed image data having the first gamut into image data having a second gamut, the second gamut being one kind of gamut selected from a plurality of kinds of selectable gamut, wherein
the first gamut contains the plurality of kinds of selectable gamut.

(A02) The image processing system according to the item (A01), wherein
one kind of gamut out of the plurality of kinds of gamut contains the other kinds of gamut, and the first gamut is the one kind of gamut.

(A03) The image processing system according to the item (A01) or (A02), wherein the image pickup device further includes a first controller configured to transmit metadata including information on the first gamut to the image processing device via the transmission path, and
the image processing device further includes a second controller configured to set a conversion matrix for the gamut converter based on information on the first gamut contained in the received metadata and based on information on the second gamut.

(A04) The image processing system according to any one of the items (A01) to (A03), wherein
the one kind of gamut is S-Gamut3.

(A05) The image processing system according to the item (A01), wherein the image pickup device further includes a first controller configured to transmit metadata including information on the first gamut to the image processing device via the transmission path, the image processing device further includes a second controller configured to set a conversion matrix for the gamut converter based on information on the first gamut contained in the received metadata and based on information on the second gamut, and the one kind of gamut contains S-Gamut3 and is wider than S-Gamut3.

The present application contains subject matter related to that disclosed in Japanese Priority Patent Application JP 2013-257372 filed in the Japan Patent Office on Dec. 12, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Image processing system
10 Image pickup device
11 Image sensor
12 Development processor
13 First gradation converter
14 Compression coder
15 First controller
20 Transmission path
30 Decoder unit
31 Expansion decoder
32 Gamut converter
33 Second gradation converter
34 Second controller

The invention claimed is:

1. An imaging processing system, comprising:
an image pickup device including an image sensor configured to output raw image data, and first circuitry configured to:
receive, over a transmission path, gamut information from a decoder of an image processing device that is communicatively coupled with the image pickup device, the gamut information indicating a plurality of kinds of gamut supported by the image processing device;
set a first gamut for the image pickup device according to the received gamut information, the set first gamut being one of the received plurality of kinds of gamut received from the image processing device;
convert the raw image data output from the image sensor into converted image data having the first gamut;
compression-code the converted image data to generate compression-coded image data; and
transmit, over the transmission path to the decoder of the image processing device, the compression-coded image data and metadata indicating the first gamut; and the image processing device including second circuitry configured to
select a second gamut;
extract, from a memory of the image processing device, based on the metadata, stored conversion information to convert an image having the first gamut to an image having the second gamut; and
decode and convert the compression-coded image data into image data having the second gamut using the extracted conversion information.

2. The system according to claim 1, wherein the metadata further includes information regarding imaging gamma used by a gradation converter of the image pickup device.

3. The system according to claim 1, wherein the second circuitry is further configured to:
determine a conversion matrix according to the first gamut indicated by the metadata and the second gamut for output image data;
decode the compression-coded image data to generate uncompressed image data having the first gamut; and
convert the uncompressed image data having the first gamut into the output image data having the second gamut based on the conversion matrix.

4. The system according to claim 3, wherein the conversion matrix corresponds to a predetermined combination of the first gamut and the second gamut.

5. The system according to claim 1, wherein the first gamut includes S-Gamut3.

6. The system according to claim 1, wherein the kinds of gamut supported by the image processing device include DCI P3, ACES, ITU-709, ITU-R BT. 709, ITU 2020, and a film gamut.

7. The system according to claim 3, wherein the second circuitry of the image processing device is further configured to store a plurality of matrices, each corresponding to a different combination of the first gamut with a respective one of the kinds of gamut supported by the image processing device.

8. The system according to claim 7, wherein the second circuitry of the image processing device is further configured to select one of the plurality of matrices as the conversion matrix based on the metadata received from the image pickup device.

9. The system according to claim 1, wherein the first circuitry of the image pickup device is further configured to adjust a gamma of the converted image data having the first gamut.

10. The system according to claim 1, wherein the first circuitry of the image pickup device is further configured to use lossy compression when compression-coding the converted image data having the first gamut.

11. The system according to claim 10, wherein the lossy compression includes MPEG compression coding.

12. The system according to claim 1, wherein the predetermined transmission path includes a serial digital interface (SDI).

13. The system according to claim 3, wherein the processing circuitry of the image processing device is further configured to adjust a gradation of the uncompressed image data having the second gamut using predetermined gamma information.

14. An image processing method, comprising:
receiving, over a transmission path by processing circuitry of an image pickup device that includes an image sensor configured to output raw image data, gamut information from an image processing device that is communicatively coupled with the image pickup device, the gamut information indicating a plurality of kinds of gamut supported by the image processing device;

setting a first gamut for the image pickup device according to the received gamut information, the set first gamut being one of the received plurality of kinds of gamut received from the image processing device;

converting, by the processing circuitry of the image pickup device, the raw image data output from the image sensor into converted image data having the first gamut;

compression-coding the converted image data to generate compression-coded image data;

transmitting, over the transmission path to a decoder of the image processing device, the compression-coded image data and metadata indicating the first gamut, selecting a second gamut;

extracting, from a memory of the image processing device, based on the metadata, stored conversion information to convert an image having the first gamut to an image having the second gamut; and decoding and converting the compression-coded image data into image data having the second gamut using the extracted conversion information.

15. A non-transitory computer-readable medium encoded with computer-readable instructions thereon, the computer-readable instructions, when executed by processing circuitry of an image pickup device that includes an image sensor configured to output raw image data, cause the processing circuitry to perform a method comprising:

receiving, over a transmission path, gamut information from an image processing device that is communicatively coupled with the image pickup device, the gamut information indicating a plurality of kinds of gamut supported by the image processing device;

setting a first gamut for the image pickup device according to the received gamut information, the set first gamut being one of the received plurality of kinds of gamut received from the image processing device;

converting the raw image data output from the image sensor into converted image data having the first gamut;

compression-coding the converted image data to generate compression-coded image data;

transmitting, over the transmission path to a decoder of the image processing device, the compression-coded image data and metadata indicating the first gamut, selecting a second gamut;

extracting, from a memory of the image processing device based on the metadata, stored conversion information to convert an image having the first gamut to an image having the second gamut; and decoding and converting the compression-coded image data into image data having the second gamut using the extracted conversion information.

16. The system according to claim 1, wherein the first gamut encompasses the plurality of kinds of gamut indicated by the gamut information.

17. The system according to claim 1, wherein the first circuitry of the image pickup device is configured to generate the metadata indicating the first gamut.

\* \* \* \* \*